United States Patent
Shiono

(10) Patent No.: US 6,556,194 B1
(45) Date of Patent: Apr. 29, 2003

(54) METHOD OF MERGING THREE-DIMENSIONAL SHAPE DATA AND METHOD OF REPRESENTING THREE-DIMENSIONAL SHAPE DATA

(75) Inventor: Koichi Shiono, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/414,180

(22) Filed: Oct. 7, 1999

(30) Foreign Application Priority Data

Oct. 8, 1998 (JP) .......................................... 10-286391

(51) Int. Cl.⁷ .............................................. G06T 17/00
(52) U.S. Cl. ...................................... 345/419; 348/420
(58) Field of Search ................................ 348/418, 419, 348/420, 421, 422, 427, 428

(56) References Cited

U.S. PATENT DOCUMENTS 5,706,419 A * 1/1998 Matsugu et al. ............ 345/435
5,894,310 A * 4/1999 Arsenault et al. ........... 345/433
6,198,487 B1 * 3/2001 Fortenbery et al. ......... 345/420

OTHER PUBLICATIONS

Curless, Brian and Levoy, Marc, "A Volumetric Method for Building Complex Models from Range Images", *In Proceedings of ACM Siggraph '92*, 1996, pp. 303–312, Stanford, California.

Wheeler, Mark D., Sato, Yoichi, and Ikeuchi, Katsushi, "Consensus Surfaces for Modeling 3D Objects from Multiple Range Images", *In Proceedings of ICCV*, Jan. 1998, pp. 917–924.

* cited by examiner

*Primary Examiner*—Cliff N. Vo
(74) *Attorney, Agent, or Firm*—Sidley Austin Brown & Wood LLP

(57) ABSTRACT

A plurality of partial shape data that are obtained from widely varying viewpoints (potential directions) are registered. Each of the partial shape data is represented by shape vectors, and corresponding shape vectors representing the plurality of partial shape data are merged through vector arithmetic to thereby obtain shape vectors representing shape data that is obtained by merging the plurality of partial shape data.

8 Claims, 5 Drawing Sheets

+0.5  0.0  −0.5

0.0

POTENTIAL DIRECTION

POTENTIAL DIRECTION

METHOD OF MERGING THREE-DIMENSIONAL SHAPE DATA AND METHOD OF REPRESENTING THREE-DIMENSIONAL SHAPE DATA

BACKGROUND OF THE INVENTION

This application is based on the application No. 10-286391 filed in Japan, the contents of which are hereby incorporated by reference.

1. Field of the Invention

The present invention relates to a method of merging three-dimensional (3-D) shape data and a method of representing the same, especially in a vector potential space.

2. Description of the Background Art

Now, the concept of merging of 3-D shape data is described with reference to FIGS. 1 and 2. To obtain 3-D shape data (hereinafter referred to as "shape data") describing the shape of a three-dimensional object, it is necessary to capture a range image of the object using an apparatus such as a 3-D scanner. Here image capturing only from a single viewpoint is not enough to capture the entire 3-D object due to the presence of blind spots; thus, the images must be taken from a plurality of viewpoints. Accordingly, registration and merging of the shape data obtained from different viewpoints become necessary.

FIG. 1 shows an example of 3-D image capturing, wherein a cup CP is captured from two different directions A, B indicated by the arrows. Two shape data obtained have different surfaces even through registration since they have different origin points, etc. This state is shown in FIG. 2. FIG. 2 schematically shows misalignment between the two shape data when viewed from the opening of the cup CP. As shown, shape data CP1 (indicated by hatching) obtained from the direction A is not in proper alignment with shape data CP2 obtained from the direction B. Merging is the process that integrates such two shape data without misalignment.

Referring now to FIGS. 3 through 7, a conventional merging method is described. FIGS. 3 and 4 show partial shape data 1 and 2, respectively, a portion of overlap therebetween being enclosed by the closing lines.

FIG. 5 shows a registration result of the partial shape data 1 and 2, i.e., shape data 3 represented by range potential (range function). This representation is hereinafter referred to as a potential representation. The range potential is a concept that relatively indicates where is the position of the surface of a three-dimensional object when seen from a viewpoint. In FIG. 5, the surface of the 3-D object is viewed in the direction of the arrow, so it is assumed that a potential value of the shape data 3 is 0, a potential value of data closer to the viewpoint by a predetermined distance than the shape data 3 is –0.5, and a potential value of data farther from the viewpoint by a predetermined distance than the shape data 3 is +0.5. In this case, a potential direction equals the direction of the arrow. The potential value is calculated for each neighbor point (e.g., all neighbor voxels) considered as necessary in shaped surface processing. A line obtained by connecting every point in space with the potential value of –0.5 is a contour line of the potential value –0.5 and a line obtained by connecting every point in space with the potential value of +0.5 is a contour line of the potential value +0.5.

By using the potential representation for the shape data, a boundary portion, i.e., the shape of the surface of a three-dimensional object, which has been represented by a series of polygons, can be represented by cubes called voxels. This brings about the effect of shortening processing time required for the shape data.

FIG. 6 shows merged shape data 3A obtained through arithmetic operations, such as addition of the potential (range) values, on the shape data 3 in potential representation.

Then, shape data with the potential value of 0 is extracted by an isosurface extraction technique such as a marching cubes method, and a voxel representation is returned to a polygon.representation so that the boundary portion is represented by polygons. FIG. 7 shows the extracted shape data with the potential value of 0.

The above conventional merging method merges shape data in potential representation through arithmetic operations such as addition of the potential (range) values. This method works well when the potential directions, i.e., viewing positions, of the respective partial shape data 1, 2 to be merged are not so different as shown in FIG. 5, but it fails to provide an accurate merging result of the shape data when the potential directions vary widely.

SUMMARY OF THE INVENTION

One aspect of the present invention is directed to a method of merging a plurality of three-dimensional shape data describing shapes of a three-dimensional object taken from a plurality of viewpoints, comprising the steps of: (a) performing registration of the plurality of shape data to obtain a plurality of registered shape data; (b) representing each of the plurality of registered shape data by shape vectors which depend on positions of points on a surface of the three-dimensional object, each of the shape vectors having a range component and a directional component; and (c) merging the plurality of registered shape data each represented by the shape vectors, through vector arithmetic. Preferably, origin points of the shape vectors should be on the surface of the three-dimensional object.

Since the registered shape data each represented by the shape vectors are merged through vector arithmetic, even if three-dimensional shape data are obtained from widely varying viewpoints (potential directions), merging of the registered shape data becomes more accurate than merging based only on the scalar quantity.

According to another aspect of the present invention, the step (b) of the method of merging a plurality of three-dimensional shape data includes the step of forming voxels corresponding to the shape vectors in a space including shape.

According to still another aspect of the present invention, the step (c) of the method of merging a plurality of three-dimensional shape data includes the step of merging corresponding shape vectors representing the plurality of registered shape data.

This method considerably facilitates the merging of registered shape data.

Still another aspect of the present invention is directed to a method of representing three-dimensional shape data describing a shape of a three-dimensional object. The method comprises the step of providing shape vectors which depend on positions of points on a surface of the three-dimensional object, each of the shape vectors having a range component and a directional component, and the step of representing the three-dimensional shape data by using the shape vectors. Preferably, origin points of the shape vectors should be on the surface of the three-dimensional object.

Since the three-dimensional shape data is represented by the shape vectors each having a range component and a directional component, the amount of information on the three-dimensional shape data increases, whereby more accurate data processing becomes possible.

These and other objects, features, aspects and advantages of the present invention will become more apparent from the following detailed description of the present invention when taken in conjunction with the accompanying drawings.

DESCRIPTION OF THE PREFERRED EMBODIMENTS

Referring now to FIGS. 8 through 12, we will describe an embodiment of a method of merging three-dimensional (3-D) shape data according to the present invention.

Figure 1:
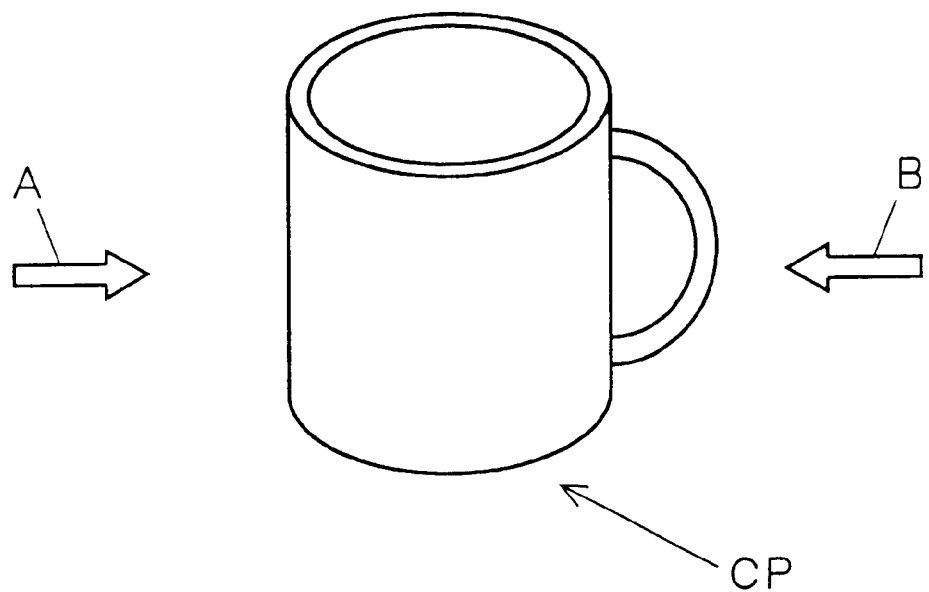
FIG. 1 is an illustration of 3-D image capturing.
Figure 2:
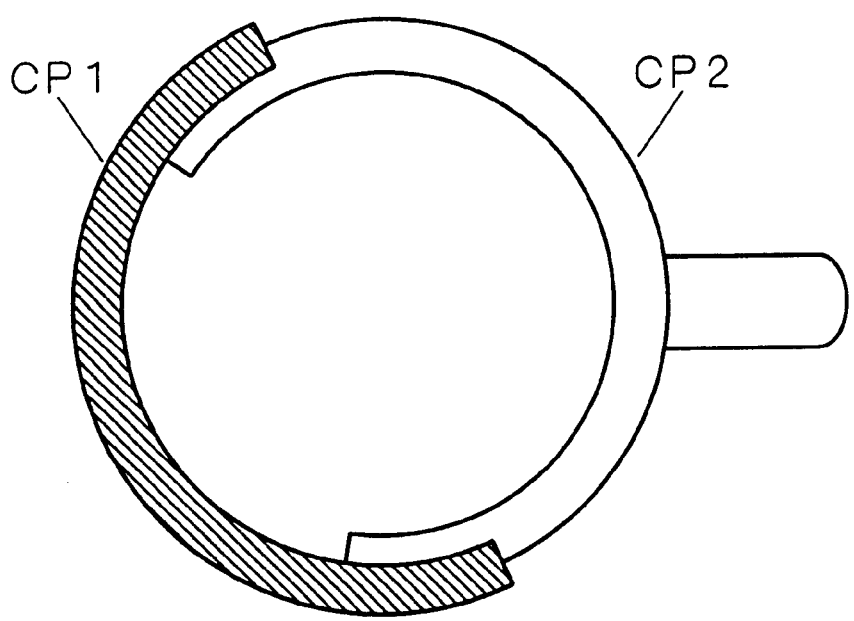
FIG. 2 schematically shows misalignment between two shape data.
Figure 3:
FIGS. 3 and 4 are schematic diagrams of partial shape data to be merged.
Figure 4:
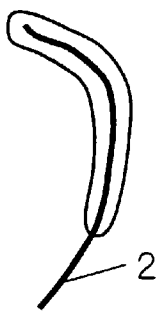
Figure 5:
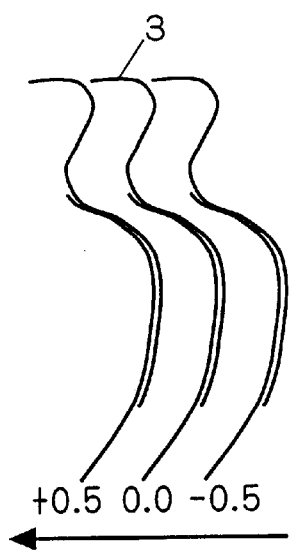
FIG. 5 is a schematic diagram of registered shape data in potential representation.
Figure 6:
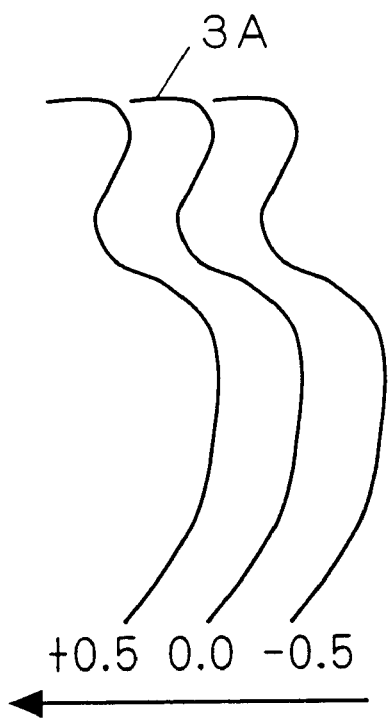
FIG. 6 is a schematic diagram of merged shape data in a conventional merging method.
Figure 7:
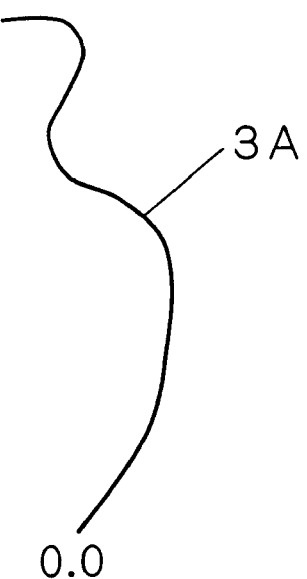
FIG. 7 is a schematic diagram of extracted shape data.
Figure 8:
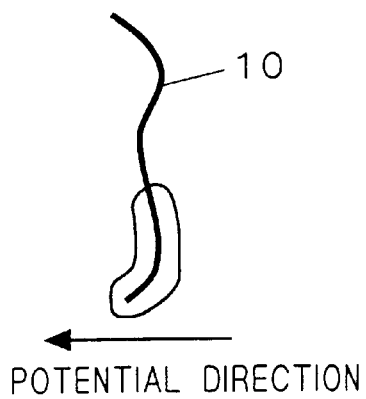
FIGS. 8 and 9 are schematic diagrams of partial shape data to be merged.
Figure 9:
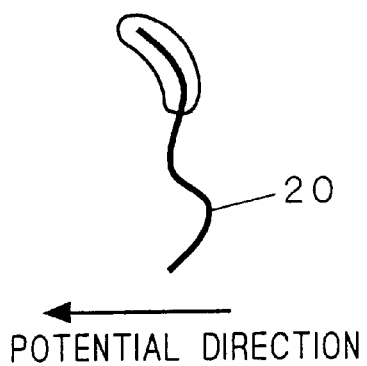

FIGS. 8 and 9 show partial shape data 10 and 20 to be merged, respectively, portions of overlap therebetween being enclosed by the closing lines. In FIGS. 8 and 9, a potential direction is indicated by the arrow.

In the case of FIGS. 8 and 9, shape data is obtained using a distance meter for measuring distance toward a single direction, so each of the partial shape data 10 and 20 has only a single potential direction.

Figure 10:
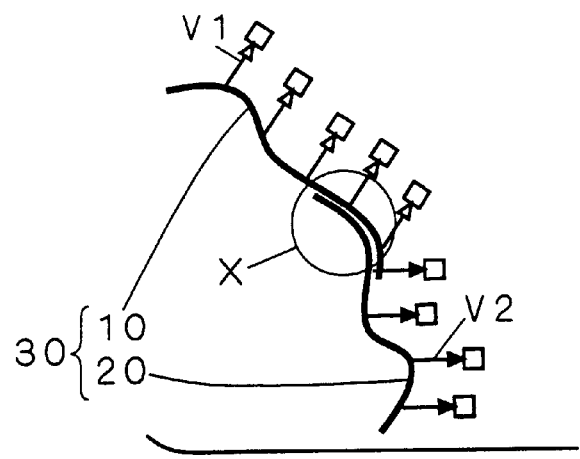
FIG. 10 is a schematic diagram of registered shape data in a merging method according to one embodiment of the present invention.

FIG. 10 shows a registration result of the partial shape data 10 and 20, i.e., registered shape data 30 represented by vectors with their origin points on the shape surface and their end points in space near the surface (e.g., voxels). These vectors are hereinafter referred to as shape vectors and the above points in space (e.g., voxels) take on the values of the shape vectors. The shape vector is a kind of position vector having a range component and a directional component. A potential value is used as the range component and a potential direction as the directional component. Further, a lot of voxels are provided in a space including the shape surface, each having the value of a shape vector.

In FIG. 10, as for part of voxels, shape vectors V1 of the partial shape data 10 are indicated by the white arrows and shape vectors V2 of the partial shape data 20 are indicated by the black arrows. As a result of registration, the partial shape data 10 and 20 in FIG. 10 have different potential directions (i.e., their vectors have different directional components).

Figure 11:
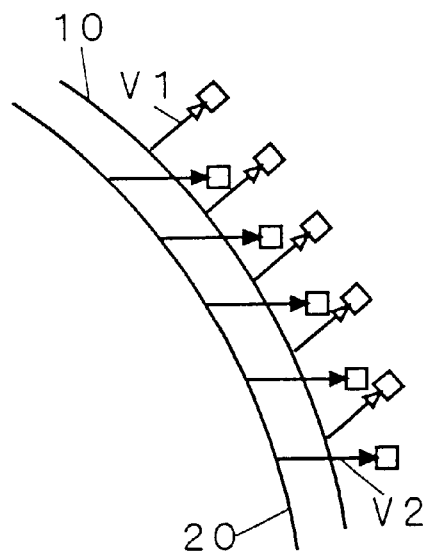
FIG. 11 is a schematic diagram showing part of the registered shape data in detail.

The details of an overlapping portion X between the partial shape data 10 and 20 in FIG. 10 are illustrated in FIG. 11. As shown, the partial shape data 10 and 20 have different surfaces in the stage of registration, so their shape vectors V1 and V2 are independent of each other. While the conventional merging method has a problem of inaccurate merging when the partial shape data have different potential directions since the merging is performed through arithmetic operations such as addition of the potential (range) values (i.e., scalar quantities), the present method resolves this problem by representing the partial shape data 10 and 20 by the shape vectors V1 and V2, respectively, and merging the data 10, 20 through arithmetic operations on the shape vectors (cf. Equation 1):

$$f(V1, V2 \ldots ) = V3 \tag{1}$$

Equation (1) states that a merged shape vector V3 is obtained through vector arithmetic f with a plurality of shape vectors as input variables.

Figure 12:
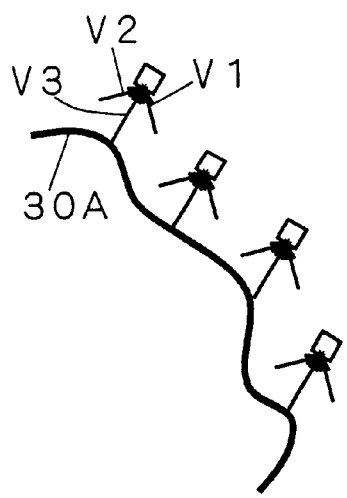
FIG. 12 is a schematic diagram of merged shape data in the merging method according to the above embodiment of the present invention.

FIG. 12 is an illustration of an addition of vectors for merging to obtain merged shape data 30A. This vector arithmetic can be expressed by:

$$V3 = V1 + V2 \tag{2}$$

The arithmetic of the equation (2) is merely an addition of vectors, but there are many variations. For example, the vectors may be multiplied by a predetermined factor as follows:

$$V3 = \frac{1}{2}(V1 + V2) \tag{3}$$

In practical merging, shape data with the vector of 0 is extracted by means of isosurface extraction such as the Marching Cubes algorithm, and the voxel representation is returned to the polygon representation so that the boundary portion is represented by polygons.

Representing the shape data by the shape vectors in a range potential space means that the amount of information on the shape data increases and thus further accurate data processing becomes possible. Therefore, the present method is also useful for other processing, besides merging of shape data.

In the foregoing description, each of the partial shape data 10, 20 has only a single potential direction, but in consideration of the fact that the partial shape data 10 and 20 are processed in a unit of voxel, each voxel may have different potential directions.

The present invention may be embodied by either a computer system controlled in accordance with software programs or a hardware system having individual hardware elements for conducting the respective steps as described in the preferred embodiments. Both of the software elements and the hardware elements are included in the system.

While the invention has been shown and described in detail, the foregoing description is in all aspects illustrative and not restrictive. It is therefore understood that numerous modifications and variations can be devised without departing from the scope of the invention.

What is claimed is:

1. A method of merging a plurality of three-dimensional shape data describing shapes of a three-dimensional object taken from a plurality of viewpoints, comprising the steps of:

(a) performing registration of said plurality of shape data to obtain a plurality of registered shape data;

(b) representing each of said plurality of registered shape data by respective shape vectors, each of said shape vectors having a range component and a directional component, origin points of said shape vectors being on a surface of said three-dimensional object; and (c) merging said plurality of registered shape data each represented by said shape vectors, through vector arithmetic.

2. The method according to claim 1, wherein said step (b) includes the step of forming voxels corresponding to said shape vectors in a space including shape.

3. The method according to claim 1, wherein said step (c) includes the step of merging corresponding shape vectors representing said plurality of registered shape data.

4. A method of representing three-dimensional shape data describing a shape of a three-dimensional object, said method comprising the steps of:

providing shape vectors each having a range component and a directional component, origin points of said shape vectors being on a surface of said three-dimensional object; and representing said three-dimensional shape data by using said shape vectors.

5. A method of merging a plurality of three-dimensional shape data describing shapes of a three-dimensional object taken from a plurality of viewpoints, comprising the steps of:

(a) performing registration of said plurality of shape data to obtain a plurality of registered shape data;

(b) representing each of said plurality of registered shape data by respective shape vectors which depend on positions of points on a surface of said three-dimensional object, each of said shape vectors having a range component and a directional component; and (c) merging said plurality of registered shape data each represented by said shape vectors, through vector arithmetic.

6. The method according to claim 5, wherein said step (b) includes the step of forming voxels corresponding to said shape vectors in a space including shape.

7. The method according to claim 5, wherein said step (c) includes the step of merging corresponding shape vectors representing said plurality of registered shape data.

8. A method of representing three-dimensional shape data describing a shape of a three-dimensional object, said method comprising the steps of:

providing shape vectors which depend on positions of points on a surface of said three-dimensional object, each of said shape vectors having a range component and a directional component; and representing said three-dimensional shape data by using said shape vectors.

* * * * *